(12) United States Patent
Schep et al.

(10) Patent No.: US 9,449,642 B2
(45) Date of Patent: *Sep. 20, 2016

(54) RECORD CARRIER AND APPARATUS FOR SCANNING THE RECORD CARRIER

(71) Applicant: KONINKLIJKE PHILIPS N.V., Eindhoven (NL)

(72) Inventors: Cornelis Marinus Schep, Weesp (NL); Aalbert Stek, Emmen (NL); Sebastian Egner, Berlin (DE); Constant Paul Marie Jozef Baggen, Blerick (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/143,073

(22) Filed: Dec. 30, 2013

(65) Prior Publication Data

US 2014/0112116 A1    Apr. 24, 2014

Related U.S. Application Data

(63) Continuation of application No. 11/845,140, filed on Aug. 27, 2007, now Pat. No. 8,644,119, which is a continuation of application No. 10/481,143, filed as application No. PCT/IB02/02736 on Jun. 27, 2002, now Pat. No. 7,274,627.

(30) Foreign Application Priority Data

Jul. 2, 2001   (EP) .................................... 01202545

(51) Int. Cl.
    *G11B 27/19*    (2006.01)
    *G11B 27/24*    (2006.01)
    (Continued)

(52) U.S. Cl.
    CPC ...... *G11B 20/10481* (2013.01); *G11B 7/00745* (2013.01); *G11B 7/24082* (2013.01); *G11B 27/24* (2013.01); *G11B 27/3027* (2013.01);
    (Continued)

(58) Field of Classification Search
    CPC ................ G11B 2220/218; G11B 2220/2545; G11B 27/24; G11B 27/3027; G11B 20/10481; G11B 2220/216; G11B 2220/2525; G11B 27/3036; G11B 7/00; G11B 7/00745; G11B 7/24082
    USPC ................... 369/44.13, 47.19, 124.04, 275.4
    See application file for complete search history.

(56) References Cited

U.S. PATENT DOCUMENTS 4,542,424 A    9/1985  Ishihara
4,901,300 A    2/1990  Van Der Zande et al.
(Continued)

FOREIGN PATENT DOCUMENTS

CA    1319984       7/1993
JP    10208249 A1   8/1998
(Continued)

*Primary Examiner* — Dionne H Pendleton

(57) ABSTRACT

A record carrier has a servo track indicating an information track intended for recording information blocks. The servo track has a variation of a physical parameter, referred to as wobble. The wobble is modulated for encoding record carrier information, such as addresses. The servo track is subdivided in modulated parts in which the frequency and/or phase of the variation deviates from the wobble frequency, and non-modulated parts. The slope of the wobble is substantially continuous at transitions between the modulated and non-modulated parts by using wobbles starting at the maxima or minima of the wobble in a first part of the modulated parts.

54 Claims, 5 Drawing Sheets

Figure 1A:
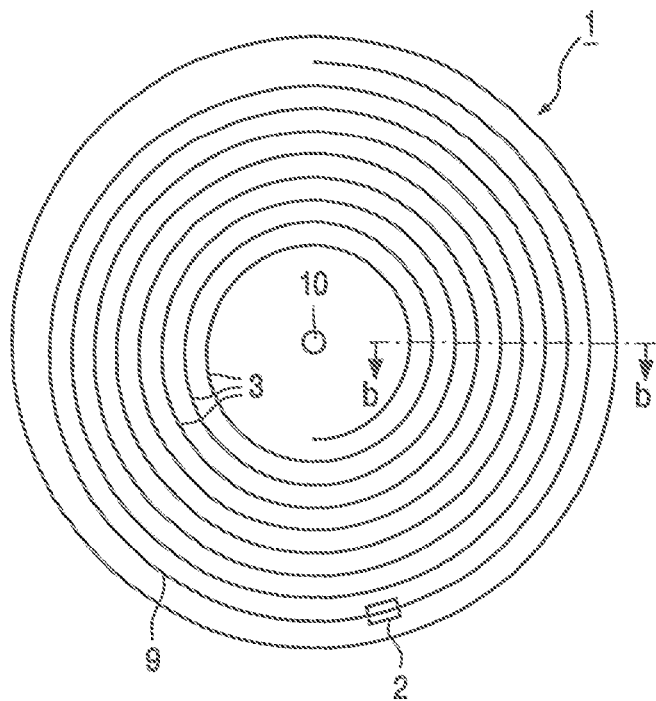

(51) Int. Cl.
  *G11B 20/10* (2006.01)
  *G11B 7/007* (2006.01)
  *G11B 7/24082* (2013.01)
  *G11B 27/30* (2006.01)
  *G11B 7/00* (2006.01)

(52) U.S. Cl.
  CPC ............ *G11B 7/00* (2013.01); *G11B 2220/216* (2013.01); *G11B 2220/218* (2013.01); *G11B 2220/2525* (2013.01); *G11B 2220/2545* (2013.01)

(56) References Cited

U.S. PATENT DOCUMENTS

| | | | |
|---|---|---|---|
| 5,363,360 A * | 11/1994 | Fairchild | ............ 369/47.21 |
| 5,999,504 A | 12/1999 | Aoki | |
| 6,151,281 A | 11/2000 | Van Der Enden et al. | |
| 6,310,838 B1 | 10/2001 | Heemskerk et al. | |
| 6,538,982 B1 | 3/2003 | Van Vlerken et al. | |
| 6,765,861 B2 | 7/2004 | Van Vlerken et al. | |
| 6,827,999 B2 | 12/2004 | Ito et al. | |
| 6,952,388 B2 | 10/2005 | Nijboer et al. | |
| 6,999,391 B2 | 2/2006 | Heemskerk et al. | |
| 7,085,209 B2 * | 8/2006 | Schep | ............ G11B 7/007 369/275.3 |
| 7,110,332 B2 | 9/2006 | Schep et al. | |
| 7,184,391 B2 | 2/2007 | Lee et al. | |
| 7,274,627 B2 * | 9/2007 | Schep | ............ G11B 7/00745 369/124.04 |
| 8,644,119 B2 * | 2/2014 | Schep et al. | ........ 369/44.13 |
| 2002/0018411 A1 | 2/2002 | Kumagai | |
| 2003/0099180 A1 | 5/2003 | Park et al. | |
| 2004/0160884 A1 | 8/2004 | Lee et al. | |
| 2004/0170091 A1 * | 9/2004 | Schep | ............ G11B 7/00745 369/44.13 |
| 2008/0002535 A1 | 1/2008 | Schep et al. | |
| 2008/0037394 A1 * | 2/2008 | Stek | ............ G11B 7/0053 369/47.36 |

FOREIGN PATENT DOCUMENTS

| | | |
|---|---|---|
| JP | 2001338421 A | 12/2001 |
| JP | 2004534346 A | 11/2004 |
| KR | 20010092389 A | 10/2001 |
| WO | 0043996 | 7/2000 |

\* cited by examiner

RECORD CARRIER AND APPARATUS FOR SCANNING THE RECORD CARRIER

This application is a continuation of prior U.S. patent application Ser. No. 11/845,140, filed Aug. 27, 2007, and issued as U.S. Pat. No. 8,644,119, which is continuation of prior U.S. patent application Ser. No. 10/481,143, filed Dec. 17, 2003, and issued as U.S. Pat. No. 7,274,627, which is a National Stage Application of PCT/IB02/02736, filed Jun. 27, 2002, and which claims the benefit of European Patent Application No. 01202545.8, filed Jul. 2, 2001, the entire contents of each of which are incorporated herein by reference thereto.

The invention relates to a record carrier comprising a servo track indicating an information track intended for recording information blocks, which servo track has a variation of a physical parameter at a predetermined frequency which variation is modulated for encoding record carrier information, and which servo track has modulated parts in which the frequency and/or phase of the variation deviates from the predetermined frequency, and non-modulated parts having only said periodic variation.

The invention further relates to recording and/or playback device comprising means for writing and/or reading information blocks in an information track on a record carrier that comprises a servo track indicating the information track, which device comprises means for scanning the servo track and demodulation means for retrieving record carrier information from a variation of a physical parameter of the servo track at a predetermined frequency, which servo track has modulated parts in which the frequency and/or phase of the variation deviates from the predetermined frequency, and non-modulated parts having only said periodic variation.

The invention further relates to a method for manufacturing the record carrier.

A record carrier and device for reading and/or writing information are known from WO 00/43996 (PHN 17323). The information is encoded into an information signal which includes address codes and is subdivided in accordance with the address codes into information blocks. The record carrier has a servo track, usually called pregroove, for causing servo signals to be generated when scanning the track. A physical parameter, e.g. the radial position, of the pregroove periodically varies constituting a so-called wobble. During the scanning of the track, this wobble leads to a variation of the servo signals and a wobble signal can be generated. The wobble is modulated using phase modulation for encoding position information. Usually the phase modulation used for encoding digital position information is called Phase Shift Keying (PSK). During recording the position information is retrieved from the wobble signal and is used for positioning the information blocks by keeping a predefined relation between the address codes in the information blocks and the position information.

A problem of the known system is that the wobble signal comprises low frequency components in the frequency range which is used by the tracking servo system. Hence the servo system is disturbed by the wobble modulation. Further the modulated wobble signal may comprise high frequency components in the frequency range of the information signal, and therefore disturb the correct detection of the information from the retrieved information signal.

It is an object of the invention, for example, to provide a record carrier and device in which the above disturbance due to the wobble signal is reduced.

According to the invention a record carrier as defined in the opening paragraph is characterized in that the slope of the variation is substantially continuous at transitions between the modulated and non-modulated parts. Further, the recording and/or playback device as described in the opening paragraph is characterized in that the demodulation means comprise detection means for detecting modulated parts starting at transitions between the modulated and non-modulated parts at which the slope of the variation is substantially continuous. The invention is based on the following recognition. Many optical recording formats contain a periodic variation of the servo track, usually called wobble, inter alia for write-clock generation, which wobble is usually predominantly monotonic to reduce write-clock jitter. In modulated parts the frequency is changed or even phase jumps are used, and the transitions between not modulated and modulated parts occur when the amplitude of the wobble is zero. The inventors have seen that due to the discontinuities in the slope of the wobble of such transitions additional low and high frequency components are generated in the resulting wobble signal. By shifting the transitions to a point in the wobble where the amplitude is not zero but where the slope of the non modulated signal before and the modulated signal after the transition are substantially equal such disturbing frequency components are reduced.

A further embodiment of the record carrier is characterized in that the variation is substantially sinusoidal and the transitions are located at the minima and/or maxima of said sinus. The advantage is that at the peak values of a sinus, i.e. the minima and maxima, the slope of the signal is zero. Hence a change in frequency can be applied while the slope of the signal is continuous.

Further preferred embodiments of the method, devices and record carrier according to the invention are given in the further claims.

Figure 1B:
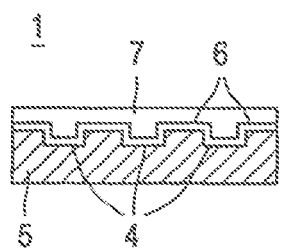
Figure 1C:
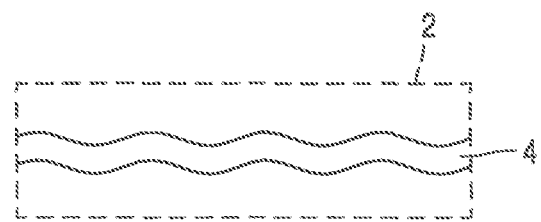
Figure 1D:
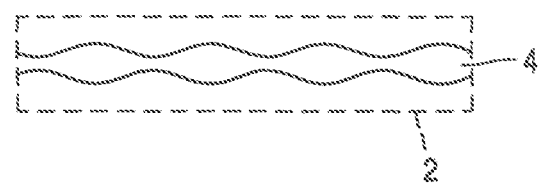
Figure 2A:
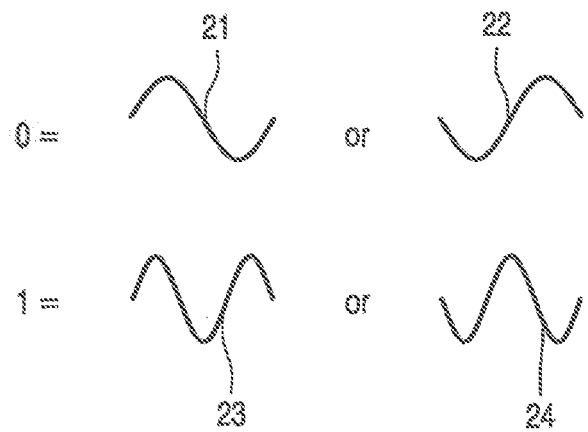
Figure 2B:
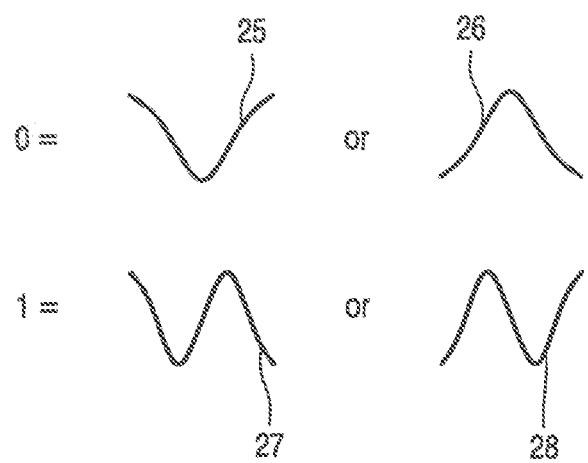
Figure 3:
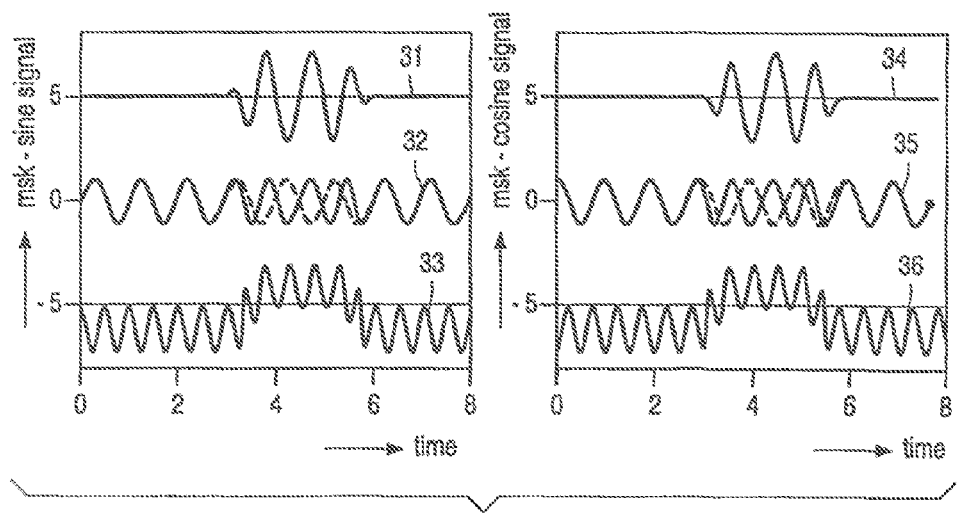
Figure 4:
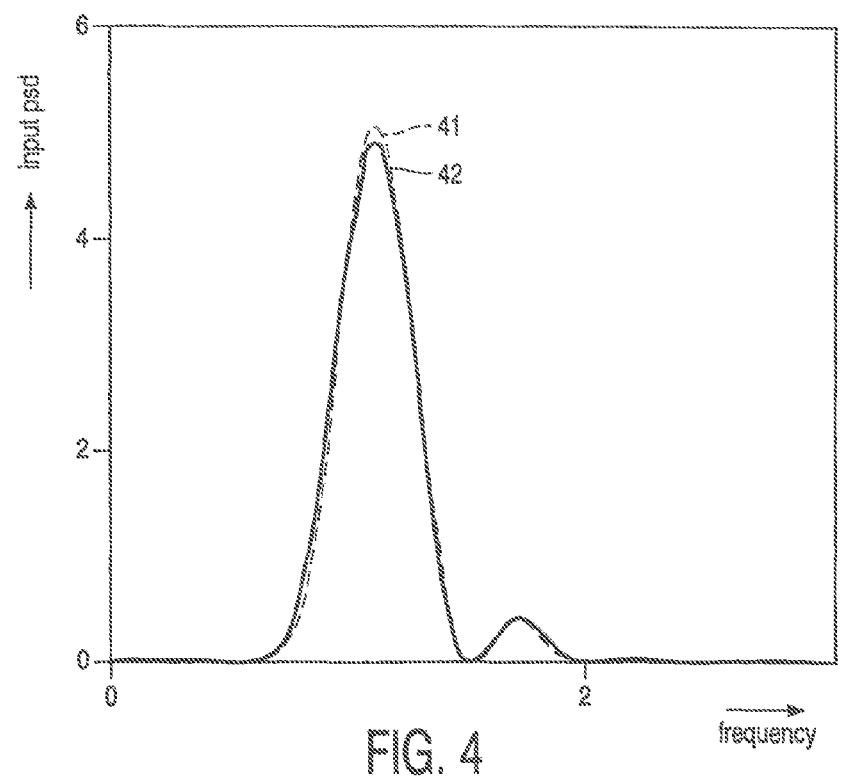
Figure 5:
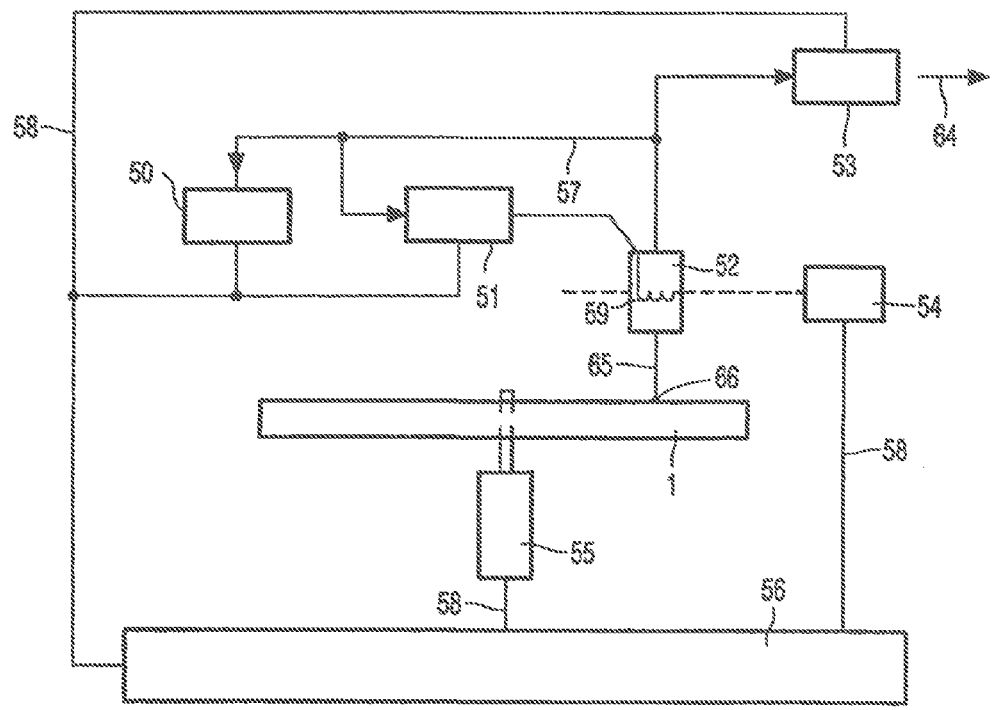
Figure 6:
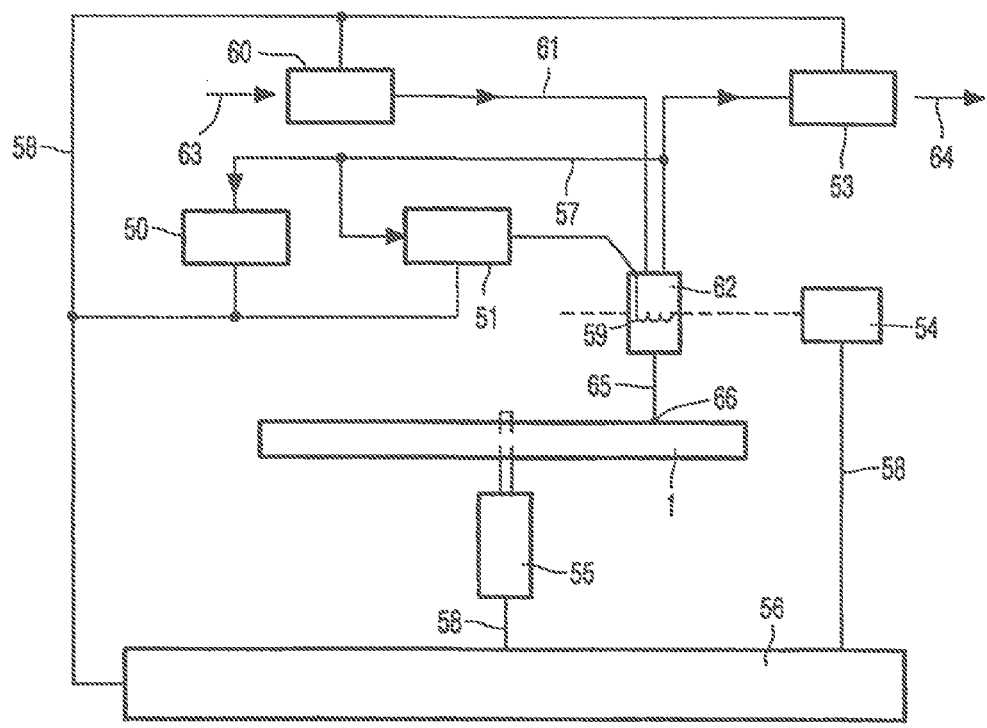
Figure 7A:
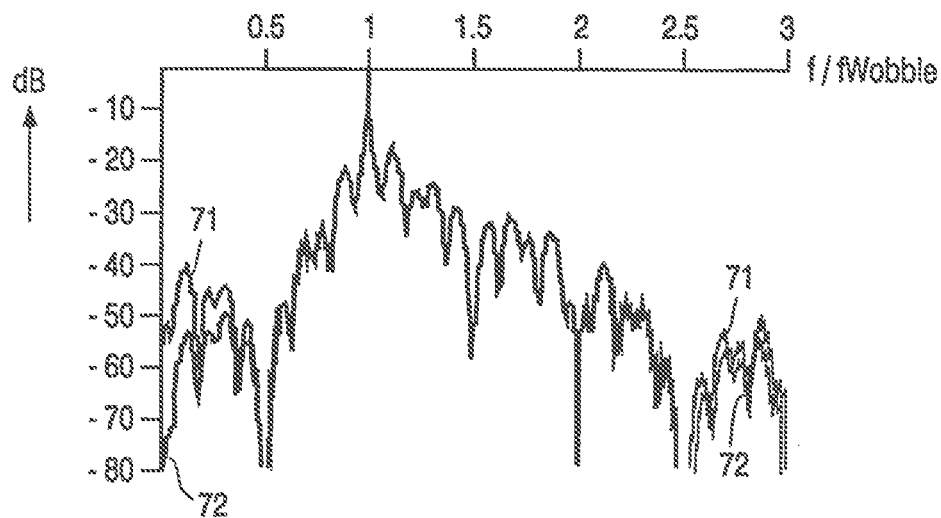
Figure 7B:
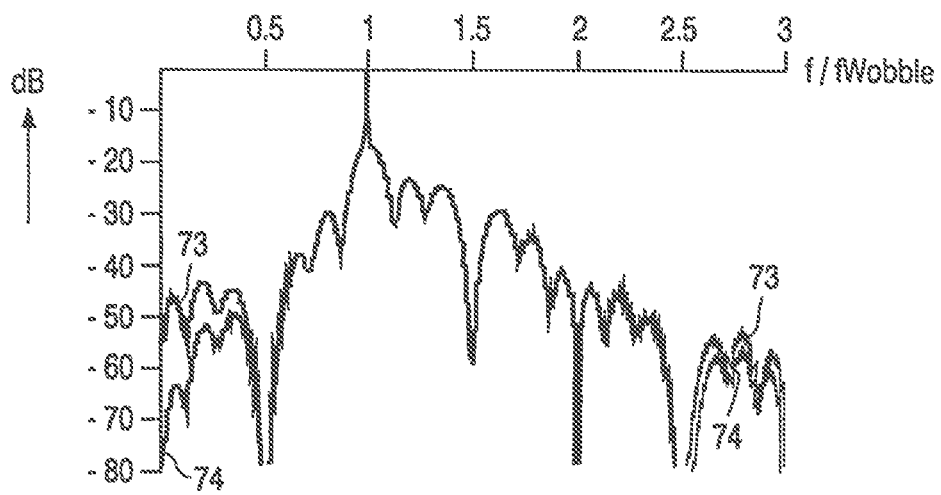

These and other aspects of the invention will be apparent from and elucidated further with reference to the embodiments described by way of example in the following description and with reference to the accompanying drawings, in which FIG. 1a shows a record carrier with a servo track (top view), FIG. 1b shows a servo track (cross section), FIG. 1c shows a wobble of a servo track (detail), FIG. 1d shows a further wobble of a servo track (detail), FIG. 2a shows the modulation of MSK-sin, FIG. 2b shows the modulation of MSK-cos, FIG. 3 shows MSK-sin and MSK-cos signals, FIG. 4 shows the power spectral density of a data bit, FIG. 5 shows a device for reading information blocks, FIG. 6 shows a device for writing information blocks, FIG. 7a shows the power spectral densities for a bit pattern, and FIG. 7b shows the power spectral densities for a further bit pattern In the Figures, elements which correspond to elements already described have the same reference numerals.

FIG. 1a shows a disc-shaped record carrier 1 provided with a track 9 intended for recording and a central hole 10. The track 9 is arranged in accordance with a spiral pattern of windings 3. FIG. 1b is a cross-section taken on the line b-b of the record carrier 1, in which a transparent substrate 5 is provided with a recording layer 6 and a protective layer 7. The recording layer 6 may be optically writable, for example via phase change, or magneto-optically writable by a device for writing information such as the known CD-Rewritable or CD-Recordable. The recording layer may also be provided with information via a production process, in which first a master disc is made which is subsequently multiplied through pressing. The information is organized in information blocks and is represented by optically readable marks in the form of a succession of areas reflecting much radiation and little radiation such as, for example a succession of pits of different lengths in a CD. In one embodiment, the track 9 on the record carrier of a rewritable type is indicated by a servopattern which is provided during manufacture of the blank record carrier. The servopattern is formed, for example by a pregroove 4 which enables a write head to follow the track 9 during scanning The pregroove 4 may be implemented as a deeper or a raised part, or as a material property deviating from its ambience. Alternatively, the servopattern may consist of an alternation of elevated and deeper windings, referred to as land and groove patterns, with a transition from land to groove or vice versa taking place per winding. FIGS. 1*c* and 1*d* show two examples of a periodical variation of a physical parameter of the pregroove, called wobble. FIG. 1*c* shows variation of the lateral position, and FIG. 1*d* shows variation of the width. This wobble produces a wobble signal in a tracking servosensor. The wobble is, for example, frequency-modulated, and position information such as an address, a time code or winding information is coded in the modulation. A description of a rewritable CD system which is provided with position information in such a way can be found in U.S. Pat. No. 4,901,300 (PHN 12.398). A servopattern may also consist of, for example, regularly distributed sub-patterns which periodically cause tracking signals.

The variation of the servo track includes relatively large parts of monotone wobble, so called non modulated parts. Further the servo track has relatively short parts where the frequency and/or phase of the wobble deviates from the predetermined wobble frequency, called modulated parts.

FIG. 2*a* shows the modulation of MSK-sin. The figure shows the variations in a modulated part of the wobble. In the Minimum Shift Keying sinus type (MSK-sin) a data value 0 is represented by a full period of the wobble 21 or an inverted period 22, starting at the zero crossing of the wobble. The data value 1 is represented by a frequency which is 1.5 times higher, so a positive starting wobble 23 or a negative starting wobble 24. Hence the MSK modulation is based on sine waves with frequency 1.0 times the wobble frequency (fwob) and sine waves with frequency 1.5*fwob. With MSK-sin the frequency changes at the zero crossings of the wobble signal. At the points where the frequency changes the slope is discontinuous.

FIG. 2*b* shows the modulation of MSK-cos. The figure shows the variations in a modulated part of the wobble. In the Minimum Shift Keying cosinus type (MSK-cos) a data value 0 is represented by a full period of the wobble 25 or an inverted period 26, starting at the maximum or minimum amplitude of the wobble. The data value 1 is represented by a frequency which is 1.5 times higher, so a positive starting wobble 27 or a negative starting wobble 28, also starting at the maximum or minimum. Hence the MSK modulation is based on sine waves with frequency 1.0*fwob and sine waves with frequency 1.5*fwob. With MSK-cos the frequency changes at the maxima or minima of the wobble signal. At the points where the frequency changes the slope is continuous. It is to be noted that all waveforms of the MSK-cos are without a DC component when integrated on the length of one wobble frequency period, whereas the 1.5*fwob waveform of MSK-sin has a DC component. The DC component may be balanced by an inverted 1.5*fwob MSK-sin waveform, but the absence of such DC components in the MSK-cos modulation results in less disturbing frequency components in the low frequency range relevant to servo systems.

FIG. 3 shows MSK-sin and MSK-cos signals. The figure shows examples of the modulated wave forms for MSK-sin (32) and MSK-cos (35) for a single data bit. The central traces (32,35) show the wave form on the disc (solid lines) for MSK-sin (left) and MSK-cos (right). For reference, the single-tone sine or cosine signals are also shown (dotted lines). Both examples are for data bit with a length of 3 wobble periods. The first and last parts of such a data bit are described above with reference to FIGS. 2*a* and 2*b*. In the middle period of said 3 periods an inverted wobble is present. The top traces (31,34) show the difference between the MSK-sin (left) and MSK-cos (right) wave forms and a reference not modulated wobble. The bottom traces (33,36) show the result of multiplying the wave forms (32,35) with the reference wobble.

FIG. 4 shows the power spectral density of a data bit. The solid line 41 is the spectrum for MSK-sin, the dashed line 41 is the spectrum for MSK-cos. The spectrum 41 of MSK-cos is narrower than the spectrum 41 of MSK-sin. In other words, MSK-cos is producing less disturbing frequency components and can be filtered more narrowly by the detector than MSK-sin. The detection performance of MSK-cos will be better compared to MSK-sin, depending on the resulting signal to noise ratio after filtering.

FIG. 5 shows a reading device for scanning a record carrier 1. Writing and reading of information on optical discs and formatting, error correcting and channel coding rules, are well-known in the art, e.g. from the CD system. The apparatus of FIG. 5 is arranged for reading the record carrier 1, which record carrier is identical to the record carriers shown in FIG. 1. The device is provided with a read head 52 for scanning the track on the record carrier and read control means comprising drive unit 55 for rotating the record carrier 1, a read circuit 53 for example comprising a channel decoder and an error corrector, tracking unit 51 and a system control unit 56. The read head comprises optical elements of the usual type for generating a radiation spot 66 focused on a track of the recording layer of the record carrier via a radiation beam 65 guided through optical elements. The radiation beam 65 is generated by a radiation source, e.g. a laser diode. The read head further comprises a focusing actuator for focusing the radiation beam 65 on the recording layer and a tracking actuator 59 for fine positioning of the spot 66 in radial direction on the center of the track. The apparatus has a positioning unit 54 for coarsely positioning the read head 52 in the radial direction on the track. The tracking actuator 59 may comprise coils for radially moving an optical element or may be arranged for changing the angle of a reflecting element on a movable part of the read head or on a part on a fixed position in the case part of the optical system is mounted on a fixed position. The radiation reflected by the recording layer is detected by a detector of a usual type, e.g. a four-quadrant diode, for generating detector signals 57 including a read signal, a tracking error and a focusing error signal. The tracking unit 51 is coupled to the read head for receiving the tracking error signal from the read head and controlling the tracking actuator 59. During reading, the read signal is converted into output information, indicated by arrow 64, in the read circuit 53. The apparatus is provided with an address detector 50 for detecting and the retrieving address information from the detector signals 57 when scanning the servo track of the record carrier. The device is further provided with a system control unit 56 for receiving commands from a controlling computer system or from a user and for controlling the apparatus via control lines 58, e.g. a system bus connected to the drive unit 55, the positioning unit 54, the address detector 50, the tracking unit 51 and the read circuit 53. To this end, the system control unit comprises control circuitry, for example a microprocessor, a program memory and control gates, for performing the procedures described below. The system control unit 56 may also be implemented as a state machine in logic circuits. The read device is arranged for reading a disc having tracks having a periodic variation, e.g. a continuous wobble. The read control unit or means are arranged for detecting the periodic variations and for reading in dependence thereon a predetermined amount data from the track. In an embodiment the read clock is synchronized to the periodic variations and the read circuit 53 reads a fixed number of channel bits for each instance of the periodic variations. In an embodiment the read control means are arranged for retrieving the data from an area of the track following an unrecorded area. In the read circuit 53 the read clock is synchronized to the periodic variations in the unrecorded area and the reading speed is adjusted during scanning the unrecorded area. Hence at the start of the recorded area the read circuit 53 is locked in to the speed of the recorded data. In particular the address detector 50 is arranged for reading record carrier information, e.g. position information and recording control data, from the modulated signal derived from the modulated wobble. The address detector 50 has a detection unit for detecting modulated wobbles starting at a predefined transition point in the wobble signal, at which transition point the slope of the wobble is continuous. For a sinusoidal wobble having the transitions at the maxima (or minima) the detecting starting point is at said maxima (or minima). In a preferred embodiment the address detector 50 includes a matched filter based on the frequency spectrum of the wobble signal. The matched filter improves the signal to noise ratio of the modulated wobble signal, because the frequency spectrum of the wobble signal is narrower than the spectrum of a wobble signal having transitions at the zero crossing. The address detector further has a word detection unit for retrieving the words of record carrier information. The beginning of such a word is detected from a synchronisation signal after a long sequence of non modulated wobbles. The occurrence and value of a data bit is detected based on the modulated wobbles. In further embodiments other types of synchronisation or decoding of the values of the record carrier information may be applied.

FIG. 6 shows a device for writing information on a record carrier according to the invention of a type which is (re) writable in, for example a magneto-optical or optical manner (via phase change or dye) by means of a beam 65 of electromagnetic radiation. The device is also equipped for reading and comprises the same elements as the apparatus for reading described above with FIG. 5, except that it has a write/read head 62 and recording control means which comprise the same elements as the read control means, except for a write circuit 60 that comprises for example a formatter, an error encoder and a channel encoder. The write/read head 62 has the same function as the read head 52 together with a write function and is coupled to the write circuit 60. The information presented to the input of the write circuit 60 (indicated by the arrow 63) is distributed over logical and physical sectors according to formatting and encoding rules and converted into a write signal 61 for the write/read head 62. The system control unit 56 is arranged for controlling the write circuit 60 and for performing the position information recovery and positioning procedure as described above for the reading apparatus. During the writing operation, marks representing the information are formed on the record carrier. The recording control means are arranged for detecting the periodic variations, for example by locking a phase locked loop to the periodicity thereof. The address detector 50 is described above with reference to FIG. 5.

FIGS. 7a and 7b show the power spectral densities (PSDs) for MSK-sin and MSK-cos for two different bit patterns that are repeated periodically. FIG. 7a shows for a certain bit pattern the PSD 71 for MSK-sin and the PSD 72 for MSK-cos. FIG. 7b shows for another bit pattern the PSD 73 for MSK-sin and the PSD 74 for MSK-cos. It shows that the PSDs for MSK-sin and MSK-cos are substantially the same in the central parts of the spectrum. However, at low frequencies around 0.1*fwob the PSD of MSK-cos is more than 10 dB lower than the PSD of MSK-sin. This is related to the absence of DC content of a one fwob period segment of the MSK-cos signal (for example at 1.5*fwob), whereas such a one period segment of MSK-sin does have a DC content which is compensated later in the signal at the next (inverse) MSK-sin segment. The low-frequency spectrum of MSK-cos is thus substantially lower than that of MSK-sin which is an advantage because of the lower distortion of the servo. Further, a more smooth wave form for MSK-cos is caused by the continuous slope in contrast to MSK-sin where the slope is discontinuous at the point where the frequency changes. Also in the high frequency range above 2*fwob the PSD for MSK-cos is somewhat lower than the PSD for MSK-cos. Hence less disturbing frequency components are present in the higher frequency ranges also.

Although the invention has been explained by embodiments using a wobble modulation, any other suitable parameter of the track may be modulated, e.g. the track width. Also for the record carrier an optical disc has been described, but other media, such as a magnetic disc or tape, may be used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. A device for manufacturing a record carrier, the device configured to:
  provide a record carrier with a servo track indicating an information track intended for recording information blocks;
  provide a servo track with a variation of a physical parameter at a predetermined frequency;
  modulate the variation for encoding record carrier information; and
  provide the servo track with:
    non-modulated parts having only the variation at a predetermined frequency, and
    modulated parts in which the frequency and/or phase of the variation deviates from the frequency and/or phase of the non-modulated parts for representing data bits of the record carrier information; and
  wherein the modulated parts comprise at least one variation of a phase that is inverse to the phase of the non-modulated periodic variations, and the data bits always start at a maximum or minimum amplitude of the variation of the physical parameter.

2. A device for manufacturing a record carrier, the device configured to:
provide the record carrier with a servo track indicating an information track intended for recording information blocks;
provide the servo track with a variation of a physical parameter at a predetermined frequency;
modulate the variation for encoding record carrier information; and
provide the servo track with:
non-modulated parts having only the variation at a predetermined frequency, and
modulated parts in which the frequency and/or phase of the variation deviates from the frequency and/or phase of the non-modulated parts for representing data bits of the record carrier information;
wherein at least one of the modulated parts comprises a variation at a second frequency, a length of the modulated part corresponding to n/2 periods of the predetermined frequency and corresponding to p/2 periods of the second frequency, n and p being different integers and being both even, and the data bits always start at a maximum or minimum amplitude of the variation of the physical parameter.

3. A tangible computer-readable storage-medium that is not a transitory propagating signal or wave, the medium modified by control information including instructions for performing a method of manufacturing a record carrier, the method comprising:
providing the record carrier with a servo track indicating an information track intended for recording information blocks;
providing the servo track with a variation of a physical parameter at a predetermined frequency;
modulating the variation for encoding record carrier information; and
providing the servo track with:
non-modulated parts having only the variation at a predetermined frequency, and
modulated parts in which the frequency and/or phase of the variation deviates from the frequency and/or phase of the non-modulated parts for representing data bits of the record carrier information; and
wherein the modulated parts comprise at least one variation of a phase that is inverse to the phase of the non-modulated periodic variations, and the data bits always start at a maximum or minimum amplitude of the variation of the physical parameter.

4. A tangible computer-readable storage-medium that is not a transitory propagating signal or wave, the medium modified by control information including instructions for performing a method of manufacturing a record carrier comprising acts of:
providing the record carrier with a servo track indicating an information track intended for recording information blocks;
providing the servo track with a variation of a physical parameter at a predetermined frequency;
modulating the variation for encoding record carrier information; and
providing the servo track with:
non-modulated parts having only the variation at a predetermined frequency, and
modulated parts in which the frequency and/or phase of the variation deviates from the frequency and/or phase of the non-modulated parts for representing data bits of the record carrier information;
wherein at least one of the modulated parts comprises a variation at a second frequency, a length of the modulated part corresponding to n/2 periods of the predetermined frequency and corresponding to p/2 periods of the second frequency, n and p being different integers and being both even, and the data bits always start at a maximum or minimum amplitude of the variation of the physical parameter.

5. A record carrier comprising:
a servo track indicating an information track intended for recording information blocks, the servo track having a variation of a physical parameter including a wobble configured to generate a wobble signal during scanning of the servo track, wherein the variation is modulated for encoding record carrier information, and wherein the servo track has:
non-modulated parts having only the variation at a predetermined frequency, and
modulated parts in which the frequency and/or phase of the variation deviates from the frequency and/or phase of the non-modulated parts for representing data bits of the record carrier information, and
wherein:
the modulated parts comprise at least one variation of a phase that is inverse to the phase of the non-modulated periodic variations, and
the data bits always start at a maximum or minimum amplitude of the wobble signal.

6. The record carrier of claim 5, wherein a first part of the modulated parts comprises a variation at a transition frequency, a length of the first part corresponding to m periods of the predetermined frequency and corresponding to 1.5 * m periods of the transition frequency, m being an integer.

7. The record carrier of claim 6, wherein the length of the first part corresponds to one period of the predetermined frequency.

8. The record carrier of claim 5, wherein a last part of the modulated parts comprises a variation at the transition frequency, a length of the last part corresponding to m periods of the predetermined frequency, the first part and the last part being separated by an intermediate part comprising a variation at the predetermined frequency having the phase that is inverse to the phase of the variation in the non-modulated parts.

9. The record carrier of claim 5, wherein a data bit having a first value is represented by a frequency of the wobble signal, and a data bit having a second value is represented by a higher frequency that is higher than the frequency of the wobble signal, and wherein a frequency change to the higher frequency starts at the minimum or maximum amplitude of the wobble signal.

10. The record carrier of claim 5, wherein the data bits end at a further maximum amplitude of the wobble signal.

11. The record carrier of claim 10, wherein a data bit has a length of m wobble periods, wherein the data bit starts and ends at maximum amplitudes of the wobble signal during first and last periods of the m wobble periods, and wherein the data bit includes an inverted wobble signal at at least one period between the first and last periods.

12. The record carrier of claim 5, wherein at least one of the modulated parts comprises a variation at a second frequency, a length of the modulated part corresponding to n/2 periods of the predetermined frequency and corresponding to p/2 periods of the second frequency, n and p being different integers and being both even.

13. A record carrier comprising:
a servo track indicating an information track intended for recording information blocks, the servo track having a variation of a physical parameter including a wobble configured to generate a wobble signal during scanning of the servo track, wherein the variation is modulated for encoding record carrier information, and wherein the servo track has:
   non-modulated parts having only the variation at a predetermined frequency, and
   modulated parts in which the frequency and/or phase of the variation deviates from the frequency and/or phase of the non-modulated parts for representing data bits of the record carrier information, and
wherein:
   at least one of the modulated parts comprises a variation at a second frequency, a length of the modulated part corresponding to n/2 periods of the predetermined frequency and corresponding to p/2 periods of the second frequency, n and p being different integers and being both even, and
   the data bits always start at a maximum or minimum amplitude of the wobble signal.

14. The record carrier of claim 13, wherein the modulated parts comprise at least one variation of a phase that is inverse to the phase of the non-modulated periodic variations.

15. The record carrier of claim 13, wherein a first part of the modulated parts comprises a variation at a transition frequency, a length of the first part corresponding to m periods of the predetermined frequency and corresponding to 1.5*m periods of the transition frequency, m being an integer.

16. The record carrier of claim 15, wherein the length of the first part corresponds to one period of the predetermined frequency.

17. The record carrier of claim 13, wherein a last part of the modulated parts comprises a variation at the transition frequency, a length of the last part corresponding to m periods of the predetermined frequency, the first part and the last part being separated by an intermediate part comprising a variation at the predetermined frequency having a phase that is inverse to the phase of the variation in the non-modulated parts.

18. The record carrier of claim 13, wherein a data bit having a first value is represented by a frequency of the wobble signal, and a data bit having a second value is represented by a frequency that is higher than the frequency of the wobble signal, and wherein a frequency change to the higher frequency starts at the minimum or maximum amplitude of the wobble signal.

19. The record carrier of claim 13, wherein the data bits end at the minimum or maximum amplitude of the wobble signal.

20. The record carrier of claim 19, wherein a data bit has a length of m wobble periods, wherein the data bit starts and ends at maximum amplitudes of the wobble signal during first and last periods of the m wobble periods, and wherein the data bit includes an inverted wobble signal at at least one period between the first and last periods.

21. A recording and/or playback device comprising:
a read-write device configured to write and/or read information blocks in an information track on a record carrier that comprises a servo track indicating the information track,
a scanner configured to scan the servo track, and
a demodulator configured to retrieve record carrier information from a signal generated by a variation of a physical parameter of the servo track, wherein the servo track has:
   non-modulated parts having only the variation at a predetermined frequency, and
   modulated parts in which the frequency and/or phase of the variation deviates from the frequency and/or phase of the non-modulated parts for representing data bits of the record carrier information, and
wherein:
   the modulated parts comprise at least one variation of a phase that is inverse to the phase of the non-modulated periodic variations; and
   the data bits always start at a maximum or minimum amplitude of the signal generated by the variation of the physical parameter.

22. The device of claim 21, wherein the demodulator comprises a detector configured to detect the modulated parts starting at transitions between the modulated and non-modulated parts at which the slope of the variation is substantially continuous, the variation being substantially a sinusoidal variation, and the transitions being located at minima and/or maxima of the variation, and the detector is configured to detect starting at the minima and/or maxima.

23. The device of claim 22, wherein the detector is further configured to detect a number of periodic variations of the phase that is inverse to the phase of the non-modulated periodic variations.

24. The device of claim 22, wherein the detector comprises a matched filter based on a frequency spectrum of the signal generated by the modulated parts.

25. The device of claim 22, wherein the detector is further configured to detect the modulated parts having a first part comprising a variation at a transition frequency, a length of the first part corresponding to m periods of the predetermined frequency and corresponding to 1.5*m periods of the transition frequency, m being an integer.

26. The device of claim 25, wherein the length of the first part corresponds to one period of the predetermined frequency.

27. The device of claim 22, wherein the detector is configured to detect the modulated parts having a last part comprising a variation at the transition frequency, a length of the last part corresponding to m periods of the predetermined frequency, the first part and the last part being separated by an intermediate part comprising a variation at the predetermined frequency having a phase that is inverse to the phase of the variation in the non-modulated parts.

28. The device of claim 21, wherein the variation of the physical parameter includes a wobble configured to generate a wobble signal during scanning of the servo track, and wherein the data bits always start at a maximum or minimum amplitude of the wobble signal.

29. The device of claim 28, wherein a data bit having a first value is represented by a frequency of the wobble signal, and a data bit having a second value is represented by a frequency that is higher than the frequency of the wobble signal, and wherein a frequency change to the higher frequency starts at the minimum or maximum amplitude of the wobble signal.

30. The device of claim 28, wherein the data bits end at the minimum or maximum amplitude of the wobble signal.

31. The device of claim 30, wherein a data bit has a length of m wobble periods, wherein the data bit starts and ends at maximum amplitudes of the wobble signal during first and last periods of the m wobble periods, and wherein the data bit includes an inverted wobble signal at at least one period between the first and third periods.

32. The device of claim 21, wherein at least one of the modulated parts comprises a variation at a second frequency, a length of the modulated part corresponding to n/2 periods of the predetermined frequency and corresponding to p/2 periods of the second frequency, n and p being different integers and being both even.

33. A recording and/or playback device comprising:
a read-write device configured to write and/or read information blocks in an information track on a record carrier that comprises a servo track indicating the information track;
a scanner configured to scan the servo track; and
a demodulator configured to retrieve record carrier information from a signal generated by a variation of a physical parameter of the servo track, wherein the servo track has:
non-modulated parts only having the variation at a predetermined frequency, and
modulated parts in which the frequency and/or phase of the variation deviates from the frequency and/or phase of the non-modulated parts for representing data bits of the record carrier information;
wherein:
at least one of the modulated parts comprises a variation at a second frequency,
a length of the modulated part corresponding to n/2 periods of the predetermined frequency and corresponding to p/2 periods of the second frequency, n and p being different integers and being both even, and
the data bits always start at a maximum or minimum amplitude of the signal generated by the variation of the physical parameter.

34. The device of claim 33, wherein the modulated parts comprise at least one variation of a phase that is inverse to the phase of the non-modulated periodic variations.

35. The device of claim 33, wherein the demodulator comprises a detector configured to detect the modulated parts starting at transitions between the modulated and non-modulated parts at which the slope of the variation is substantially continuous, the variation being substantially a sinusoidal variation, and the transitions being located at minima and/or maxima of the variation, and the detector is further configured to detect starting at the minima and/or maxima.

36. The device of claim 35, wherein the detector is further configured to detect the modulated parts having a first part comprising a variation at a transition frequency, a length of the first part corresponding to m periods of the predetermined frequency and corresponding to 1.5*m periods of the transition frequency, m being an integer.

37. The device of claim 36, wherein the length of the first part corresponds to one period of the predetermined frequency.

38. The device of claim 35, wherein the detector is further configured to detect the modulated parts having a last part comprising a variation at the transition frequency, a length of the last part corresponding to m periods of the predetermined frequency, the first part and the last part being separated by an intermediate part comprising a variation at the predetermined frequency having a phase that is inverse to the phase of the variation in the non-modulated parts.

39. The device of claim 33, wherein the variation of the physical parameter includes a wobble configured to generate a wobble signal during scanning of the servo track, and wherein the data bits always start at a maximum or minimum amplitude of the wobble signal.

40. The device of claim 39, wherein a data bit having a first value is represented by a frequency of the wobble signal, and a data bit having a second value is represented by a frequency that is higher than the frequency of the wobble signal, and wherein a frequency change to the higher frequency starts at the minimum or maximum amplitude of the wobble signal.

41. The device of claim 39, wherein the data bits end at the minimum or maximum amplitude of the wobble signal.

42. The device of claim 41, wherein a data bit has a length of n wobble periods, wherein the data bit starts and ends at minimum or maximum amplitudes of the wobble signal during first and last periods of m wobble periods, and wherein the data bit includes an inverted wobble signal at least one period between the first and last periods.

43. A method of manufacturing a record carrier, the method comprising the acts:
providing the record carrier with a servo track indicating an information track intended for recording information blocks;
providing the servo track with a variation of a physical parameter at a predetermined frequency;
modulating the variation for encoding record carrier information; and
providing the servo track with:
non-modulated parts having only the variation at a predetermined frequency, and
modulated parts in which the frequency and/or phase of the variation deviates from the frequency and/or phase of the non-modulated parts for representing data bits of the record carrier information; and
wherein the modulated parts comprise at least one variation of a phase that is inverse to the phase of the non-modulated periodic variations, and the data bits always start at a maximum or minimum amplitude of the variation of the physical parameter.

44. The method of claim 43, further comprising providing transitions between the modulated and non-modulated parts when a slope of the variation is substantially continuous, the variation being substantially a sinusoidal variation, and the transitions being located at minima and/or maxima of the sinusoidal variation.

45. The method of claim 43, wherein a first part of the modulated parts comprises a variation at a transition frequency, a length of the first part corresponding to m periods of the predetermined frequency and corresponding to 1.5*m periods of the transition frequency, m being an integer.

46. The method of claim 45, wherein the length of the first part corresponds to one period of the predetermined frequency.

47. The method of claim 43, wherein a last part of the modulated parts comprises a variation at the transition frequency, a length of the last part corresponding to m periods of the predetermined frequency, the first part and the last part being separated by an intermediate part comprising a variation at the predetermined frequency having a phase that is inverse to the phase of the variation in the non-modulated parts.

48. The method carrier of claim 43, wherein the variation of the physical parameter includes a wobble configured to generate a wobble signal during scanning of the servo track, and wherein the data bits always start at a maximum or minimum amplitude of the wobble signal.

49. The method of claim 48, wherein a data bit having a first value is represented by a frequency of the wobble signal, and a data bit having a second value is represented by a frequency that is higher than a frequency of the wobble signal, and wherein a frequency change to the higher frequency starts at a further maximum amplitude of the wobble signal.

50. The method of claim 48, wherein the data bits end at a further maximum amplitude of the wobble signal.

51. The method of claim 50, wherein a data bit has a length of m wobble periods, wherein the data bit starts and ends at maximum amplitudes of the wobble signal during first and last periods of the m wobble periods, and wherein the data bit includes an inverted wobble signal at at least one period between the first and third periods.

52. The method of claim 43, wherein at least one of the modulated parts comprises a variation at a second frequency, a length of the modulated part corresponding to n/2 periods of the predetermined frequency and corresponding to p/2 periods of the second frequency, n and p being different integers and being both even.

53. A method of manufacturing a record carrier comprising acts of:
providing the record carrier with a servo track indicating an information track intended for recording information blocks;
providing the servo track with a variation of a physical parameter at a predetermined frequency;
modulating the variation for encoding record carrier information; and
providing the servo track with:
non-modulated parts having only the variation at a predetermined frequency, and
modulated parts in which the frequency and/or phase of the variation deviates from the frequency and/or phase of the non-modulated parts for representing data bits of the record carrier information;
wherein at least one of the modulated parts comprises a variation at a second frequency, a length of the modulated part corresponding to n/2 periods of the predetermined frequency and corresponding to p/2 periods of the second frequency, n and p being different integers and being both even, and the data bits always start at a maximum or minimum amplitude of the variation of the physical parameter.

54. The method of claim 53, wherein the modulated parts comprise at least one variation of a phase that is inverse to the phase of the non-modulated periodic variations.

* * * * *